(12) United States Patent
Morikawa

(10) Patent No.: US 10,540,580 B2
(45) Date of Patent: Jan. 21, 2020

(54) NON-TRANSITORY STORAGE MEDIUM STORING PROGRAM, INFORMATION PROCESSING APPARATUS, PRINTING APPARATUS, AND COMMUNICATION SYSTEM

(71) Applicant: BROTHER KOGYO KABUSHIKI KAISHA, Nagoya-shi, Aichi-ken (JP)

(72) Inventor: Jun Morikawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/000,000

(22) Filed: Jun. 5, 2018

(65) Prior Publication Data
US 2018/0357521 A1    Dec. 13, 2018

(30) Foreign Application Priority Data

Jun. 7, 2017  (JP) .................................. 2017-112225

(51) Int. Cl.
*G06K 15/02*     (2006.01)
*G06F 3/12*      (2006.01)

(52) U.S. Cl.
CPC ................................ *G06K 15/1848* (2013.01)

(58) Field of Classification Search
None
See application file for complete search history.

(56) References Cited

U.S. PATENT DOCUMENTS

| | | | | |
|---|---|---|---|---|
| 6,078,399 | A * | 6/2000 | Kadota ................. | G06K 15/00 358/1.11 |
| 7,561,749 | B2 * | 7/2009 | Tamura ................. | H04N 19/60 382/232 |
| 2001/0043354 | A1 * | 11/2001 | Miyake ................. | G06K 15/02 358/1.15 |
| 2001/0043725 | A1 * | 11/2001 | Ueda ......................... | G06F 3/12 382/115 |
| 2001/0051963 | A1 | 12/2001 | Nishikawa | |
| 2002/0102028 | A1 * | 8/2002 | Keller ................. | G06F 17/3028 382/239 |
| 2003/0007180 | A1 * | 1/2003 | Urasawa ................ | G06K 15/02 358/1.16 |

(Continued)

FOREIGN PATENT DOCUMENTS

| | | | |
|---|---|---|---|
| JP | H10-063447 | A | 3/1998 |
| JP | 2739293 | B2 | 4/1998 |
| JP | 2001-260493 | A | 9/2001 |

*Primary Examiner* — Beniyam Menberu
(74) *Attorney, Agent, or Firm* — Scully, Scott, Murphy & Presser, PC

(57) ABSTRACT

A non-transitory storage medium stores a program readable by a computer of an information processing apparatus. The information processing apparatus includes a communication interface configured to communicate with a printing apparatus. When executed by the computer, the program causes the information processing apparatus to perform: creating irreversibly-compressed data representing a to-be-printed image and reversibly-compressed data representing the to-be-printed image as print image data, the to-be-printed image being an image to be printed on a sheet, the print image data being image data for printing; and transmitting the created print image data to the printing apparatus.

7 Claims, 9 Drawing Sheets

(56) References Cited

U.S. PATENT DOCUMENTS

| | | | |
|---|---|---|---|
| 2005/0102258 A1* | 5/2005 | Tecu | G06F 3/04847 |
| 2006/0117053 A1* | 6/2006 | Niikura | H04N 1/32112 |
| 2007/0047825 A1* | 3/2007 | Fujiwara | H04N 1/00838 |
| | | | 382/232 |
| 2007/0076966 A1* | 4/2007 | Lee | H04N 1/41 |
| | | | 382/239 |
| 2008/0030772 A1* | 2/2008 | Shirai | G06F 3/1204 |
| | | | 358/1.15 |
| 2008/0037882 A1* | 2/2008 | Tamura | H04N 1/64 |
| | | | 382/232 |
| 2008/0112013 A1* | 5/2008 | Ferlitsch | G06F 21/608 |
| | | | 358/3.28 |
| 2009/0040552 A1* | 2/2009 | Tanaka | G06K 15/02 |
| | | | 358/1.15 |
| 2009/0303550 A1* | 12/2009 | Hirabayashi | G06T 9/00 |
| | | | 358/448 |
| 2014/0280254 A1* | 9/2014 | Feichtner | G06K 9/00483 |
| | | | 707/755 |
| 2014/0293307 A1* | 10/2014 | Yamada | G06F 3/1215 |
| | | | 358/1.13 |
| 2015/0146245 A1* | 5/2015 | Asai | H04N 1/00222 |
| | | | 358/1.15 |
| 2016/0292548 A1* | 10/2016 | Nguyenvan | G06K 15/1868 |

\* cited by examiner

NON-TRANSITORY STORAGE MEDIUM STORING PROGRAM, INFORMATION PROCESSING APPARATUS, PRINTING APPARATUS, AND COMMUNICATION SYSTEM

CROSS REFERENCE TO RELATED APPLICATION

The present application claims priority from Japanese Patent Application No. 2017-112225, which has filed on Jun. 7, 2017, the disclosure of which is herein incorporated by reference in its entirety.

BACKGROUND

The present disclosure relates to a non-transitory storage medium storing a program readable by a computer of an information processing apparatus configured to communicate with a printing apparatus, an information processing apparatus, the printing apparatus, and a communication system.

An information processing apparatus communicable with a printing apparatus creates image data for printing (hereinafter may be referred to as "print image data") and transmits the created image data to the printing apparatus. The printing apparatus executes print processing based on the received image data.

SUMMARY

In the case where the print image data created in the information processing apparatus is transmitted to the printing apparatus, the received print image data is preferably deleted early from the printing apparatus in consideration of a capacity of a storage, for example. On the other hand, the print processing is restarted in the case where the print processing is interrupted due to a jam, for example. Thus, the received image data needs to be kept stored without deleting. Accordingly, an aspect of the disclosure relates to a technique for resolving a concern relevant to a capacity of a storage of a printing apparatus and for resolving a concern relevant to a restart of a print processing after the print processing is interrupted.

In one aspect of the disclosure, a non-transitory storage medium stores a program readable by a computer of an information processing apparatus. The information processing apparatus includes a communication interface configured to communicate with a printing apparatus. When executed by the computer, the program causes the information processing apparatus to perform: creating irreversibly-compressed data representing a to-be-printed image and reversibly-compressed data representing the to-be-printed image as print image data, the to-be-printed image being an image to be printed on a sheet, the print image data being image data for printing; and transmitting the created print image data to the printing apparatus.

In another aspect of the disclosure, an information processing apparatus includes: a communication interface configured to communicate with a printing apparatus; and a controller. The controller includes: a first image creator configured to create irreversibly-compressed data representing a to-be-printed image as print image data, the to-be-printed image being an image to be printed on a sheet, the print image data being image data for printing; a second image creator configured to create reversibly-compressed data representing the to-be-printed image as the print image data; and an image transmitter configured to transmit the created print image data to the communication interface.

In yet another aspect of the disclosure, a printing apparatus includes: a communication interface configured to communicate with an information processing apparatus; and a controller. The controller is configured to control the printing apparatus to perform: receiving irreversibly-compressed data representing a to-be-printed image and reversibly-compressed data representing the to-be-printed image from the information processing apparatus, the to-be-printed image being an image to be printed on a sheet; deleting first partial compressed data of the received reversibly-compressed data when printing of an image corresponding to the first partial compressed data is completed, the first partial compressed data being a portion of the received reversibly-compressed data; and executing print processing based on the received irreversibly-compressed data when execution of print processing based on the received reversibly-compressed data is interrupted.

In yet another aspect of the disclosure, a communication system includes: an information processing apparatus including a first controller and a first communication interface configured to communicate with a printing apparatus; and a printing apparatus including a second controller and a second communication interface configured to communicate with the information processing apparatus. The first controller is configured to perform: creating irreversibly-compressed data representing a to-be-printed image and reversibly-compressed data representing the to-be-printed image as print image data, the to-be-printed image being an image to be printed on a sheet, the print image data being image data for printing; and transmitting the created print image data to the printing apparatus. The second controller is configured to perform: receiving the irreversibly-compressed data and the reversibly-compressed data from the information processing apparatus; deleting first partial compressed data of the received reversibly-compressed data when printing of an image corresponding to the first partial compressed data is completed, the first partial compressed data being a portion of the received reversibly-compressed data; and executing print processing based on the received irreversibly-compressed data when execution of print processing based on the received reversibly-compressed data is interrupted.

BRIEF DESCRIPTION OF THE DRAWINGS

The objects, features, advantages, and technical and industrial significance of the present application of the present disclosure will be better understood by the following detailed description of one embodiment, when considered in connection with the accompanying drawings, in which.

DETAILED DESCRIPTION OF THE EMBODIMENT

Configuration of Communication System

Figure 1:
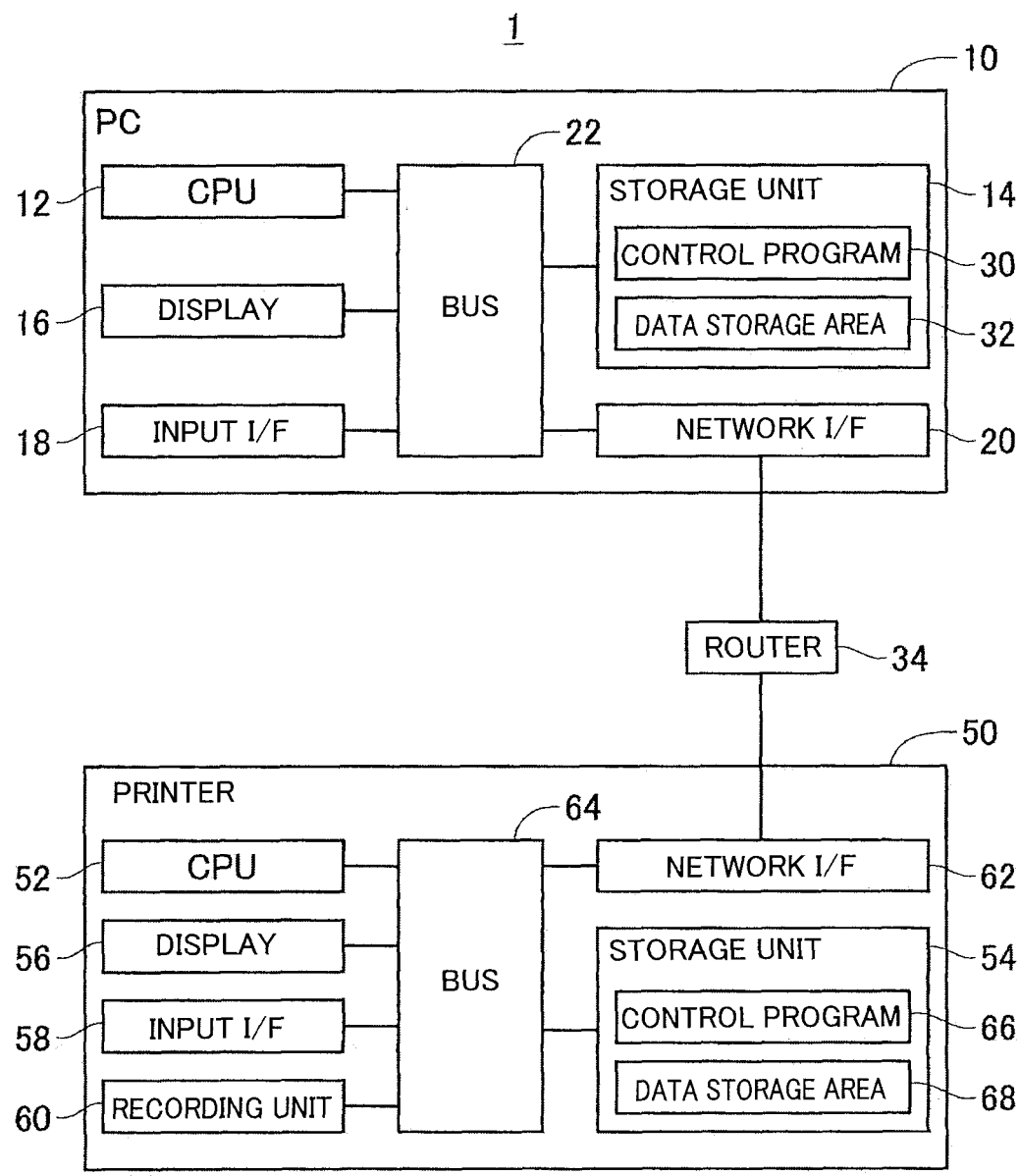
FIG. 1 is a block diagram of a communication system.

Hereinafter, there will be described one embodiment by reference to the drawings. FIG. 1 illustrates a configuration of a communication system 1 according to one embodiment. The communication system 1 includes a personal computer (PC) 10 as one example of an information processing apparatus and a printer 50 as one example of a printing apparatus.

The PC 10 includes a central processing unit (CPU) 12 (as one example of a computer, a controller, and a first controller), a storage unit 14, a display 16, an input interface 18, a network interface 20 as one example of a communication interface and a first communication interface. These devices are communicable with each other through a bus 22.

The CPU 12 executes processing according to a control program 30 stored in the storage unit 14. The control program 30 is a program for creating image data for printing (hereinafter may be referred to as "print image data"). Hereinafter, the CPU 12 that executes the control program 30 may be simply referred to as the name of the program. For example, the wording "the control program 30 executes" may mean "the CPU 12 executing the control program 30 executes".

The storage unit 14 has a data storage area 32. The data storage area 32 stores information, such as data, necessary for the CPU 12 to execute the control program 30. The storage unit 14 includes a random access memory (RAM), a read only memory (ROM), a flash memory, a hard disk drive (HDD), a buffer of the CPU 12 which are combined with each other.

The display 16 displays a screen based on image data. Examples of the display 16 include a liquid crystal display (LCD) and an organic electroluminescence (EL) display, but the display 16 is not limited to these devices. The input interface 18 includes a keyboard and a mouse operable by a user to input information. The network interface 20 is connected to the printer 50 through a router 34. This configuration enables the PC 10 to transmit and receive data to and from the printer 50.

The printer 50 includes a CPU 52 (as one example of a controller and a second controller), a storage unit 54, a display 56, an input interface 58, a recording unit 60, and a network interface 62 (as one example of a communication interface and a second communication interface). These devices are communicable with each other through a bus 64.

The CPU 52 executes processing according to a control program 66 stored in the storage unit 54. The control program 66 is a program for executing a print processing. Hereinafter, the CPU 52 that executes the control program 66 may be simply referred to as the name of the program. For example, the wording "the control program 66 executes" may mean "the CPU 52 executing the control program 66 executes".

The storage unit 54 has a data storage area 68. The data storage area 68 stores information, such as data, necessary for the CPU 52 to execute the control program 66. The storage unit 54 includes a RAM, a ROM, a flash memory, an HDD, a buffer of the CPU 52 which are combined with each other.

The display 56 displays a screen based on image data. Examples of the display 56 include an LCD and an organic EL display, but the display 56 is not limited to these devices. The input interface 58 includes keys respectively for executing functions of the printer 50. For example, the input interface 58 may be a touch panel provided on the display 56 as one unit. In this case, the touch panel receives a user operation performed on an icon displayed on the display 56. The input interface 58 may be hardware keys, for example.

The recording unit 60 is a printing mechanism such as an ink-jet head. The CPU 52 inputs a driving signal into the recording unit 60. In the case where the recording unit 60 is an ink-jet head, the recording unit 60 ejects ink from nozzles based on the input driving signal to print an image on a sheet. In the print processing in the printer 50, a sheet of the A4 size is conveyed in a state in which a widthwise direction of the sheet coincides with a sheet conveying direction orthogonal to a longitudinal direction of the sheet, and the ink-jet head is moved in the longitudinal direction of the sheet. Likewise, a sheet of the A3 size is conveyed in a state in which the longitudinal direction of the sheet coincides with the sheet conveying direction, and the ink-jet head is moved in the widthwise direction of the sheet in the print processing. That is, the printer 50 is capable of executing the print processing for the sheets of the A4 size and the A3 size.

The network interface 62 is connected to the PC 10 through the router 34. This configuration enables the printer 50 to transmit and receive data to and from the PC 10.

Operation of Communication System

In the communication system 1, the print image data is created in the PC 10 and transmitted from the PC 10 to the printer 50. The printer 50 having received the print image data executes print processing. Specifically, image data representing an image of, e.g., a document created in the PC 10, and image data representing an image acquired by the PC 10 from a device such as a scanner and a server are converted into print image data as image data representing an image to be printed (hereinafter, referred to as "to-be-printed image").

In this conversion, for example, the image data representing the to-be-printed image is compressed to reversibly-compressed data as compressed print image data. The reversibly-compressed data is data compressed by a data compressing method in which data before compression (i.e., original data) and data having been compressed from the original data and then decompressed are completely the same as each other. Examples of the reversibly-compressed data include PNG data and GIF data.

Figure 2:
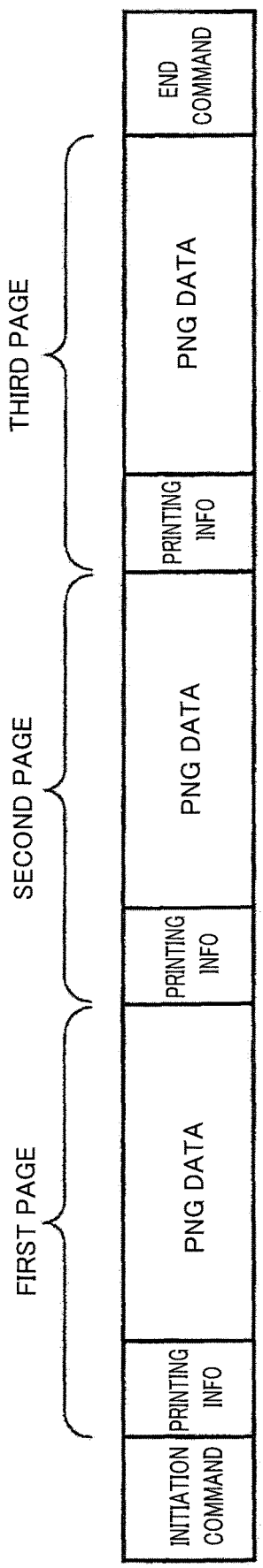
FIG. 2 is a conceptual diagram of reversibly-compressed print image data.

FIG. 2 illustrates compressed print image data created by reversibly compressing the image data representing the to-be-printed image. It is noted that this image data may be hereinafter referred to as "reversibly-compressed print image data". In the reversibly-compressed print image data illustrated in FIG. 2, PNG data is used as the reversibly-compressed data, and PNG data for three pages is included in the reversibly-compressed print image data. Printing information is added to a head of PNG data for one page. The printing information includes information on settings for the print processing, such as a sheet size, a sheet type (e.g., a plain sheet and an ink-jet sheet), printing quality, a printing color (e.g., color and monochrome), and a sheet feeding method (e.g., a sheet feeding tray). That is, the information on settings for the print processing is added to the PNG data for one page. An initiation command is added to a head of the reversibly-compressed print image data. An end command is added to a tail of the reversibly-compressed print image data.

In the printer 50, as described above, when an image is printed on the sheet of the A4 size, the sheet of the A4 size is conveyed in the state in which the widthwise direction of the sheet coincides with the sheet conveying direction, and the ink-jet head is moved in the longitudinal direction of the sheet to execute the print processing. That is, the ink-jet head reciprocates along the longitudinal direction of the sheet to execute the print processing. Thus, the PNG data included in the reversibly-compressed print image data is data representing the order of pixels arranged in the longitudinal direction of the sheet from a pixel corresponding to a corner of the sheet.

When the reversibly-compressed print image data illustrated in FIG. 2 is created by the PC 10, the reversibly-compressed print image data is transmitted to the printer 50. In the case where the to-be-printed image is a picture, an illustration, or the like, a data amount of the PNG data for one page is greater than or equal to 100 megabytes in some cases. In the present embodiment, the PNG data of greater than or equal to 100 megabytes is not transmitted all together, and a plurality of PNG data groups each having several megabytes, e.g., four megabytes, are sequentially transmitted from the head of the PNG data.

When the reversibly-compressed print image data is received, the printer 50 initiates the print processing based on the initiation command added to the head of the reversibly-compressed print image data. In this print processing, the print processing based on PNG data representing the first page is executed, and the print processing is executed based on the printing information added to the head of the PNG data representing the first page. When the print processing based on the PNG data representing the first page is completed, the PNG data representing the first page is deleted. Next, the print processing based on PNG data representing the second page is executed based on the printing information added to the head of the PNG data representing the second page. When the print processing based on the PNG data representing the second page is completed, the PNG data representing the second page is deleted. The print processing based on PNG data representing the third page is executed based on the printing information added to the head of the PNG data representing the third page. When the print processing based on the PNG data representing the third page is completed, the print processing is ended according to the end command added to the tail of the reversibly-compressed print image data.

That is, in the printer 50 having received the reversibly-compressed print image data, the PNG data for one page is not deleted until the print processing based on the PNG data for one page is completed, and the PNG data for one page is deleted after the print processing based on the PNG data for one page is completed. Since the PNG data for one page is not deleted until the print processing based on the PNG data for one page is completed, it is possible to restart the print processing based on the PNG data for one page when the print processing is interrupted due to a jam, for example.

Specifically, in the case where the print processing is interrupted due to a jam during the print processing based on the PNG data representing the second page, for example, the print processing based on the PNG data representing the second page is not completed. Thus, the PNG data representing the second page is kept stored without deleting. In the case where the jam is cleared, and a start button or the like is operated, the print processing based on the PNG data representing the second page is executed. Thus, the PNG data for one page is not deleted until the print processing based on the PNG data for one page is completed, making it possible to restart the print processing based on the PNG data for one page even in the case where the print processing is interrupted due to a jam, for example.

However, a large-capacity memory is unfortunately required to keep storing the PNG data for one page, without deleting, until the print processing based on the PNG data for one page is completed. For this reason, it is considered that the print image data is created as irreversibly-compressed data without being created as the reversibly-compressed data. That is, it is considered that the image data representing the to-be-printed image is compressed to the irreversibly-compressed data as the print image data. The irreversibly-compressed data is data compressed by a data compressing method in which data before compression (i.e., original data) and data having been compressed from the original data and then decompressed are not completely the same as each other. The irreversible compression achieves a considerably high data compression ratio when compared to the reversible compression. That is, in the case where image data representing the same to-be-printed image is compressed, a data amount of the irreversibly-compressed data is considerably less than a data amount of the reversibly-compressed data. One example of the irreversibly-compressed data is JPEG data.

Figure 3:
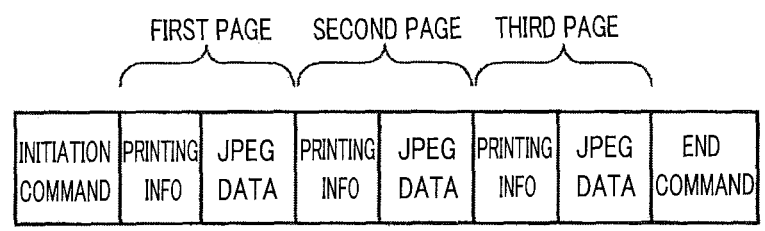
FIG. 3 is a conceptual diagram of irreversibly-compressed print image data.

FIG. 3 illustrates print image data created by irreversibly compressing the image data representing the to-be-printed image. It is noted that this image data may be hereinafter referred to as "irreversibly-compressed print image data". In the irreversibly-compressed print image data illustrated in FIG. 3, JPEG data is used as the irreversibly-compressed data, and JPEG data for three pages is included in the irreversibly-compressed print image data. Printing information is added to a head of the JPEG data for each page. An initiation command is added to a head of the irreversibly-compressed print image data. An end command is added to a tail of the irreversibly-compressed print image data.

When comparing the reversibly-compressed print image data in FIG. 2 with the irreversibly-compressed print image data in FIG. 3, a data amount of the JPEG data in FIG. 3 is approximately ¼ of a data amount of the PNG data in FIG. 2. In reality, a data amount of the JPEG data is approximately 1/100 of a data amount of the PNG data. That is, in the case where the data amount of the PNG data is approximately 100 megabytes, the data amount of the JPEG data is approximately 1 megabyte.

The data amount of the JPEG data is small as described above. Thus, a large-capacity memory is not required even in the case where the print processing based on the irreversibly-compressed print image data is executed to deal with the problem relating to the interruption of the print processing due to jam, as with the print processing based on the reversibly-compressed print image data. Specifically, in the print processing based on the irreversibly-compressed print image data, the printer 50 does not delete the JPEG data for one page until the print processing is completed, and deletes the JPEG data for one page after the print processing based on the JPEG data for one page is completed. This configuration makes it possible to restart the print processing based on the JPEG data for one page when the print processing is interrupted due to a jam, for example. Since the data amount of the JPEG data is small, a large-capacity memory is not required even in the case where the JPEG data for one page is kept stored without deleting until the print processing based on the JPEG data for one page is completed.

Thus, it is possible to eliminate the need of a large-capacity memory by compressing the image data representing the to-be-printed image to the irreversibly-compressed data as the print image data. However, since the irreversibly-compressed data is data having a high compression ratio, quality of a printed image may be deteriorated. That is, the capacity of the memory is a problem for the reversibly-compressed print image data, and the quality of the printed image is a problem for the irreversibly-compressed print image data.

Figure 4:
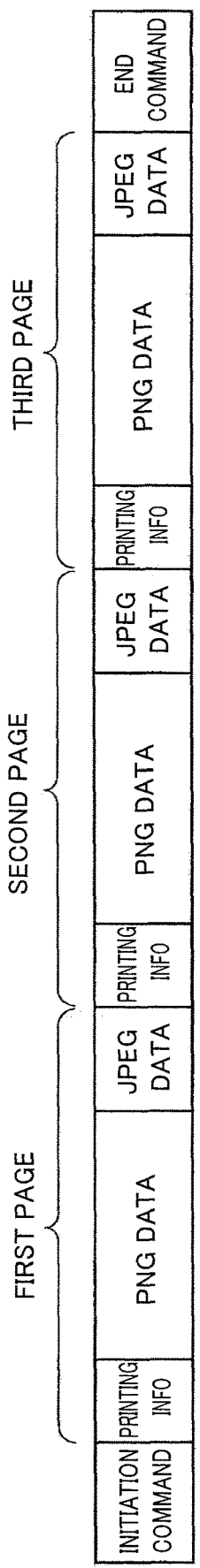
FIG. 4 is a conceptual diagram of the irreversibly-compressed print image data and the reversibly-compressed print image data.

In view of the above, the PC 10 creates both of the irreversibly-compressed data and the reversibly-compressed data representing the to-be-printed image as the print image data. Specifically, FIG. 4 illustrates print image data created by irreversibly compressing and reversibly compressing the image data representing the to-be-printed image. It is noted that the created data may be hereinafter referred to as "irreversibly-and-reversibly-compressed print image data". In the irreversibly-and-reversibly-compressed print image data illustrated in FIG. 4, the JPEG data is used as the irreversibly-compressed data, and the PNG data is used as the reversibly-compressed data. The JPEG data for three pages and the PNG data for three pages are included in the irreversibly-and-reversibly-compressed print image data, and the JPEG data representing each page and the PNG data representing each page are associated with each other. That is, the image data representing the to-be-printed image for one page is compressed to the JPEG data and the PNG data, and the PNG data representing the to-be-printed image for one page is added to a head of the JPEG data representing the to-be-printed image for one page. Printing information is added to a head of the PNG data representing each page. An initiation command is added to a head of the irreversibly-and-reversibly-compressed print image data. An end command is added to a tail of the irreversibly-and-reversibly-compressed print image data.

When the irreversibly-and-reversibly-compressed print image data illustrated in FIG. 4 is created by the PC 10, the PC 10 transmits the irreversibly-and-reversibly-compressed print image data to the printer 50. Upon receiving the irreversibly-and-reversibly-compressed print image data, the printer 50 initiates the print processing based on the initiation command added to the irreversibly-and-reversibly-compressed print image data. In this print processing, the print processing based on the PNG data representing the first page is executed based on the printing information added to the head of the PNG data representing the first page. When the print processing based on the PNG data representing the first page is completed, the print processing based on the PNG data representing the second page is executed based on the printing information added to the head of the PNG data representing the second page.

That is, in the printer 50 having received the irreversibly-and-reversibly-compressed print image data, print processing based on PNG data representing an Nth page is executed based on printing information added to a head of the PNG data representing the Nth page. In this print processing, in the case where the print processing based on the PNG data representing the Nth page is completed for one band, the printer 50 deletes PNG data corresponding to one band. It is noted that the band is a unit of movement of the ink-jet head in a predetermined direction in the print processing. One band represents movement of the ink-jet head from one to the other of opposite ends of the sheet. The band may be called a path. That is, one band may be called one path.

Thus, when the print processing for one band is completed in the print processing based on the PNG data representing the Nth page, the printer 50 deletes the PNG data corresponding to one band, i.e., the PNG data for which the print processing is completed. The print processing for a plurality of bands is executed, and the print processing based on the PNG data representing the Nth page is completed. All of the PNG data representing the Nth page are deleted by deletion of the PNG data for each band. When the print processing based on the PNG data representing the Nth page is completed, the printer 50 deletes JPEG data representing the Nth page. The print processing based on PNG data representing an (N+1)th page is then initiated.

In the case where the print processing is interrupted due to, e.g., a jam in the print processing based on the PNG data representing the Nth page, the printer 50 deletes the PNG data for which the print processing is completed in the PNG data representing the Nth page. Thus, in the case where the jam is cleared, and the print processing for the Nth page is initiated, the printer 50 executes the print processing based on the JPEG data representing the Nth page. When the print processing based on the JPEG data representing the Nth page is completed, the printer 50 deletes the JPEG data representing the Nth page. It is noted that the printer 50 does not delete but leave data other than the PNG data deleted by the print processing for one band in the PNG data representing the Nth page. Thus, the remaining PNG data is deleted after the print processing for the (N+1)th page is initiated.

Thus, in the printer 50 having received the irreversibly-and-reversibly-compressed print image data, the PNG data corresponding to one band is deleted when the print processing for one band is completed in the print processing based on the PNG data representing the Nth page. That is, until the print processing based on the PNG data representing the Nth page is completed, the PNG data representing the Nth page is not kept stored, and the PNG data for which the print processing is completed are sequentially deleted along with the print processing based on the PNG data representing the Nth page. With this processing, the PNG data having a large data amount are sequentially deleted, thereby eliminating the need of a large-capacity memory. Also, while the PNG data for which the print processing is completed are sequentially deleted along with the print processing based on the PNG data representing the Nth page, the print processing based on the JPEG data representing the Nth page is executed even in the case where the print processing is interrupted due to a jam, for example. This configuration enables restart of the print processing for the Nth page even in the case where the print processing based on the PNG data representing the Nth page is interrupted due to a jam, for example.

As described above, since the data amount of the reversibly-compressed print image data is large, the irreversibly-and-reversibly-compressed print image data is created by the PC 10, and the printer 50 executes the print processing based on the irreversibly-and-reversibly-compressed print image data. Here, considering the PNG data included in the reversibly-compressed print image data, the data amount of the PNG data as described above is greater than or equal to 100 megabytes in the case where the to-be-printed image is a picture or the like. On the other hand, the data amount of the PNG data in the case where the to-be-printed image is a document or the like, that is, a data amount of PNG data in the form of text data is relatively small. Thus, the need to create the irreversibly-and-reversibly-compressed print image data is low in the case where the to-be-printed image is a document or the like.

Accordingly, the PC 10 creates the irreversibly-and-reversibly-compressed print image data in the case where the to-be-printed image is a picture, and the PC 10 creates the reversibly-compressed print image data in the case where the to-be-printed image is a document. Specifically, when creating the print image data, the PC 10 determines whether the to-be-printed image is a picture or a document. Specifically, the PC 10 specifies the number of colors included in a region that extends in the longitudinal direction of the sheet when the to-be-printed image is printed on the sheet and that has a width of 500 pixels from a head line in the printing of the to-be-printed image. This region is one example of a particular region. That is, in the case where a sheet for the to-be-printed image is of the A4 size, the PC 10 specifies the number of colors in the particular region having a width of 500 pixels from an edge of one of long sides toward the other.

In the case where the number of colors in the particular region is large, there is a high possibility that the to-be-printed image is a picture. In the case where the number of colors in the particular region is small, there is a high possibility that the to-be-printed image is a document. Thus, in the case where the number of colors in the particular region is greater than or equal to a preset number, the PC 10 determines that the to-be-printed image is a picture, and in the case where the number of colors in the particular region is less than the preset number, the PC 10 determines that the to-be-printed image is a document.

The to-be-printed image includes text and a picture in some cases. In these cases, since the to-be-printed image includes a picture, the PNG data representing the to-be-printed image has a large data amount. Thus, in the case where the to-be-printed image includes text and a picture, the PC 10 preferably creates the irreversibly-and-reversibly-compressed print image data. Therefore, as described above, the particular region for determining whether the to-be-printed image is a picture or a document (text) extends in the longitudinal direction of the sheet having the A4 size. Thus, it is possible to appropriately determine whether the to-be-printed image includes a picture, by specifying the number of colors in the region.

Figure 5:
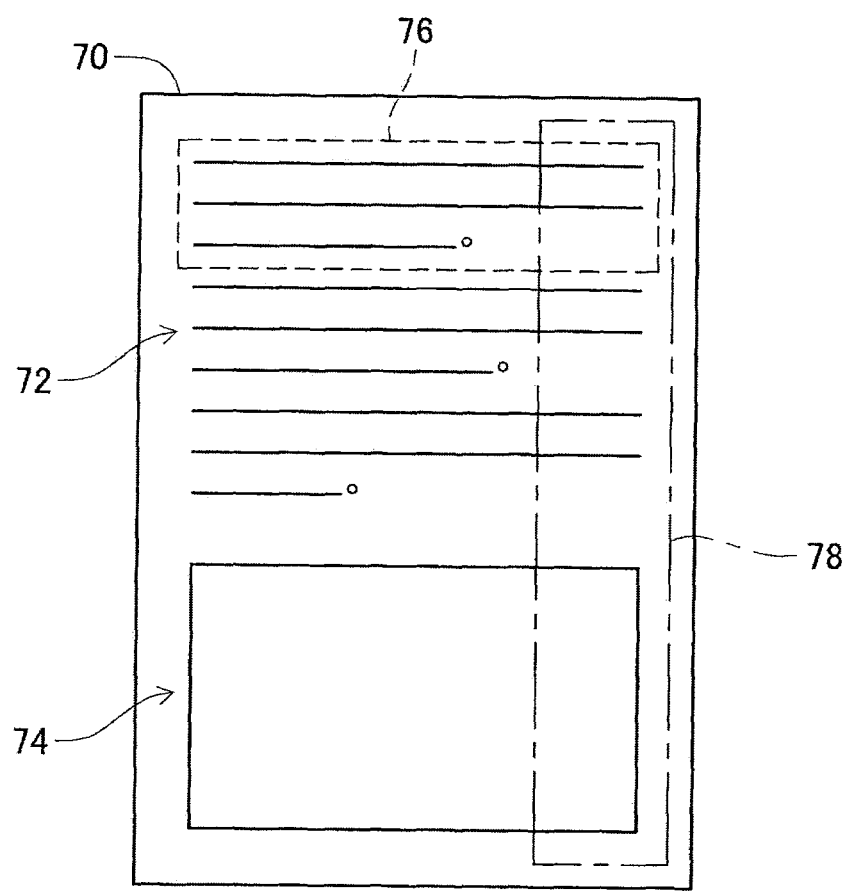
FIG. 5 is a diagram illustrating a sheet on which text and a picture are recorded.

Specifically, in the case where the to-be-printed image includes text and a picture, in general, as illustrated in FIG. 5, text 72 is recorded on a one-side portion (an upper portion in FIG. 5) of a sheet 70 in its longitudinal direction, and a picture 74 is recorded on an other-side portion (a lower portion in FIG. 5) of the sheet 70 in the longitudinal direction. In such a to-be-printed image, in the case where the number of colors in a region 76 extending in the widthwise direction of the sheet 70 is specified, only the text 72 is recorded in the region 76. Thus, the PC 10 determines that the number of colors in the region 76 is less than the preset number, and the to-be-printed image is a document (text). On the other hand, in the case where the number of colors in a region 78 extending in the longitudinal direction of the sheet 70, i.e., the particular region is specified, the region 78 includes not only the text 72 but also the picture 74. Thus, the PC 10 determines that the number of colors in the region 78 is greater than or equal to the preset number, and the to-be-printed image is a picture. Thus, it is possible to appropriately determine whether the to-be-printed image includes a picture, by setting the particular region to a region extending in the longitudinal direction of the sheet.

That is, in the case where the number of colors in the particular region is greater than or equal to the preset number, the PC 10 determines that the to-be-printed image includes a picture, and in the case where the number of colors in the particular region is less than the preset number, the PC 10 determines that the to-be-printed image is a document without including a picture. In the case where the number of colors in the particular region is greater than or equal to the preset number, the PC 10 creates the irreversibly-and-reversibly-compressed print image data. In the case where the number of colors in the particular region is less than the preset number, the PC 10 creates the reversibly-compressed print image data. It is noted that, in the case where the reversibly-compressed print image data is created, the PC 10 transmits the reversibly-compressed print image data to the printer 50, and the printer 50 executes the print processing based on the reversibly-compressed print image data. The print processing based on the reversibly-compressed print image data has been described above in detail, and an explanation thereof is omitted.

In the case where the printer 50 executes the print processing based on the reversibly-compressed print image data, the printer 50 keeps storing the PNG data for one page until the print processing based on the PNG data for one page is completed. In the case where the printer 50 executes the print processing based on the irreversibly-and-reversibly-compressed print image data, the PNG data for which the print processing is completed is deleted along with the print processing based on the PNG data for one page. Thus, in execution of the print processing, the printer 50 needs to recognize whether the PNG data for one page is kept until the print processing based on the PNG data for one page is completed, or the PNG data for which the print processing is completed is deleted along with the print processing based on the PNG data for one page.

Therefore, when creating the reversibly-compressed print image data or the irreversibly-and-reversibly-compressed print image data, the PC 10 adds a retention flag to the printing information. The retention flag indicates whether it is necessary to retain the PNG data for one page until the print processing based on the PNG data for one page is completed. An ON state of the retention flag indicates that it is necessary to retain the PNG data for one page until the print processing based on the PNG data for one page is completed. An OFF state of the retention flag indicates that it is not necessary to retain the PNG data for one page until the print processing based on the PNG data for one page is completed.

Thus, when creating the reversibly-compressed print image data, the PC 10 adds the retention flag set to ON to the printing information, and when creating the irreversibly-and-reversibly-compressed print image data, the PC 10 adds the retention flag set to OFF to the printing information. In the case where the retention flag included in the printing information is ON, the printer 50 keeps storing the PNG data for one page until the print processing based on the PNG data for one page is completed. In the case where the retention flag included in the printing information is OFF, the PNG data for which the print processing is completed is deleted along with the print processing based on the PNG data for one page.

The printer 50 is capable of executing secure print processing. In the secure print processing, the print processing is not executed unless the user performs a predetermined operation on the printer 50 even in the case where the print image data is transmitted from the PC 10 to the printer 50. That is, the printer 50 executes the print processing in the secure print processing only in the case where the user has performed the predetermined operation on the printer 50. This secure print processing enables the printer 50 to appropriately execute the print processing for a document with high confidentiality, for example.

In the secure print processing, however, the print processing is not executed until the user performs the predetermined operation. Thus, it is necessary to keep the print image data transmitted from the PC 10, until the print processing is executed. In this case, in the case where the data amount of the print image data is large, most of the data storage area 68 of the printer 50 is unfortunately occupied with image data. In view of the above, in the case where the print processing for the to-be-printed image is the secure print processing, the PC 10 creates print image data (image data for printing) which is different from the irreversibly-and-reversibly-compressed print image data.

Specifically, in the case where the print processing for the to-be-printed image is the secure print processing, the PC 10 determines whether the to-be-printed image includes a picture or the like. The method of determining whether the to-be-printed image includes a picture or the like has been described above in detail, an explanation thereof is omitted. In the case where the PC 10 determines that the to-be-printed image includes a picture or the like, the PC 10 creates the irreversibly-compressed print image data. When creating the irreversibly-compressed print image data, the PC 10 adds the retention flag set to ON to the printing information. The PC 10 then transmits the created irreversibly-compressed print image data to the printer 50, and the printer 50 keeps the irreversibly-compressed print image data in the data storage area 68 until the predetermined operation is performed by the user. Since the data amount of the irreversibly-compressed print image data is relatively small as described above, the printer 50 is less affected by storing of the irreversibly-compressed print image data in the data storage area 68. When the predetermined operation is performed by the user, the printer 50 executes the print processing based on the irreversibly-compressed print image data. The print processing based on the irreversibly-compressed print image data has been described above in detail, an explanation thereof is omitted.

In the case where the PC 10 determines that the to-be-printed image does not include a picture or the like, that is, in the case where the PC 10 determines that the to-be-printed image is a document, the PC 10 creates the reversibly-compressed print image data. The PC 10 then transmits the created reversibly-compressed print image data to the printer 50, and the printer 50 keeps the reversibly-compressed print image data in the data storage area 68 until the predetermined operation is performed by the user. In the case where the to-be-printed image is a document, the data amount of the reversibly-compressed print image data is relatively small as described above. Thus, the printer 50 is less affected by storing of the reversibly-compressed print image data in the data storage area 68. When the predetermined operation is performed by the user, the printer 50 executes the print processing based on the reversibly-compressed print image data.

As described above, in the case where the print processing for the to-be-printed image is the secure print processing, and the to-be-printed image includes a picture or the like, the PC 10 creates the irreversibly-compressed print image data. Also, in the case where the print processing for the to-be-printed image is the secure print processing, and the to-be-printed image is a document without including a picture or the like, the PC 10 creates the reversibly-compressed print image data. Accordingly, it is possible to reduce the effects caused by storing of the print image data in the data storage area 68 before the secure print processing is executed and after the print image data is transmitted from the PC 10 to the printer 50.

Control Program

Figure 6:
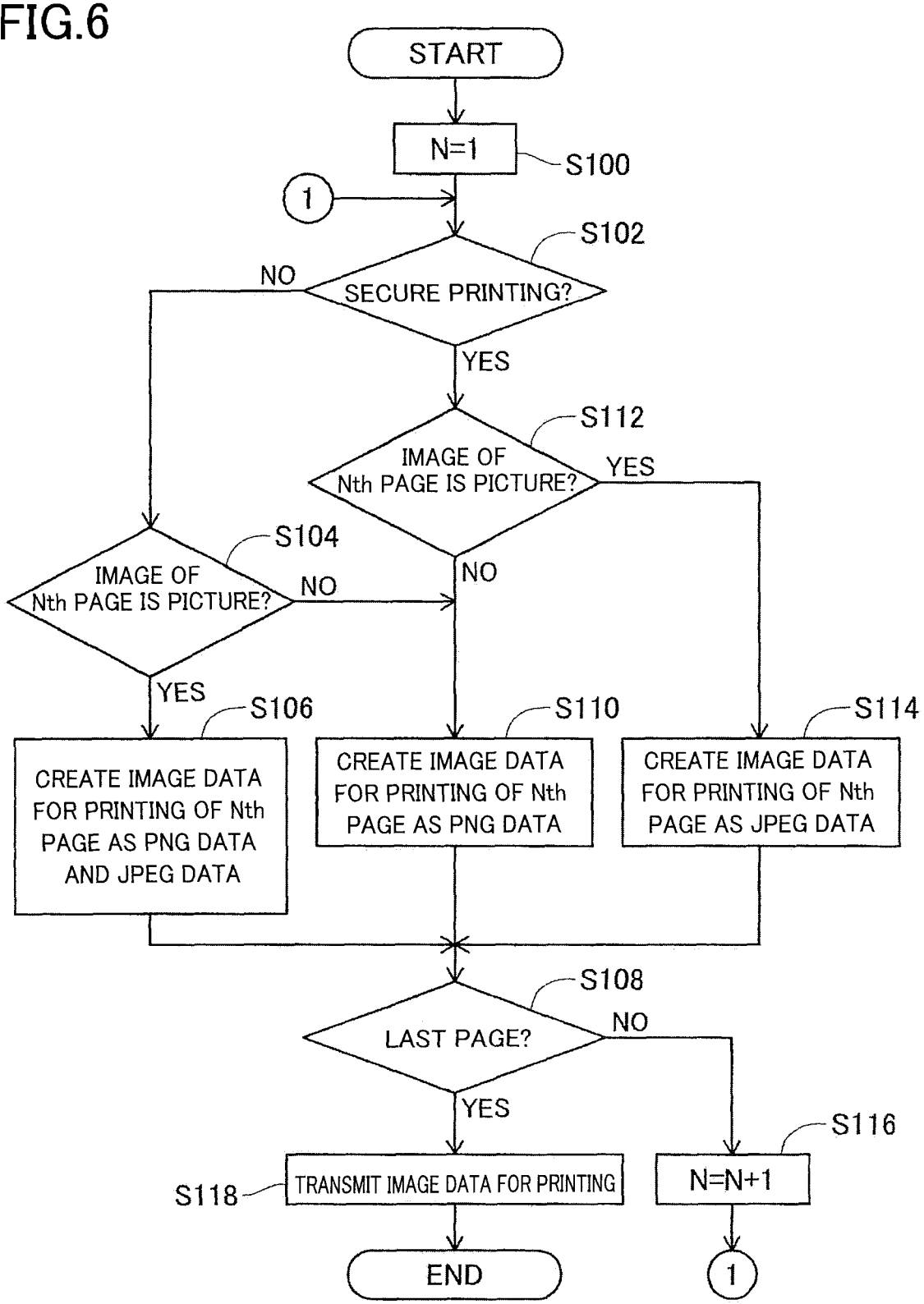
FIG. 6 is a flowchart of a control program of a PC.

In the PC 10, the CPU 12 executes the control program 30 to create the print image data. There will be next described, with reference to FIG. 6, a flow of processing when the control program 30 is executed.

This flow begins with S100 at which the PC 10 sets N to one. The PC 10 at S102 determines whether the print processing for the to-be-printed image is the secure print processing. When the print processing for the to-be-printed image is not the secure print processing (S102: NO), the PC 10 at S104 determines whether the to-be-printed image of the Nth page includes a picture. The method of determining whether the to-be-printed image includes a picture has been described, an explanation thereof is omitted.

When the to-be-printed image of the Nth page includes a picture (S104: YES), the PC 10 at S106 creates the print image data representing the Nth page as the PNG data and creates the print image data representing the Nth page as the JPEG data. That is, the PC 10 creates the irreversibly-and-reversibly-compressed print image data. Upon completion of this processing, this flow goes to S108.

When the to-be-printed image of the Nth page does not include a picture (S104: NO), the PC 10 at S110 creates the print image data representing the Nth page as the PNG data. That is, the PC 10 creates the reversibly-compressed print image data. Upon completion of this processing, this flow goes to S108.

When the print processing for the to-be-printed image in S102 is the secure print processing (S102: YES), the PC 10 at S112 determines whether the to-be-printed image of the Nth page includes a picture. When the to-be-printed image of the Nth page does not include a picture (S112: NO), the PC 10 at S110 creates the print image data representing the Nth page as the PNG data. That is, the PC 10 creates the reversibly-compressed print image data. Upon completion of this processing, this flow goes to S108.

When the to-be-printed image of the Nth page includes a picture (S112: YES), the PC 10 at S114 creates the print image data representing the Nth page as the JPEG data. That is, the PC 10 creates the irreversibly-compressed print image data. Upon completion of this processing, this flow goes to S108.

The PC 10 at S108 determines whether the Nth page is the last page. When the Nth page is not the last page (S108: NO), the PC 10 adds one to N at S116. Upon completion of this processing, this flow returns to S102. When the Nth page is the last page (S108: YES), the PC 10 at S118 transmits the print image data created at S106, S110, and S114, to the printer 50, and this flow ends.

Figure 8:
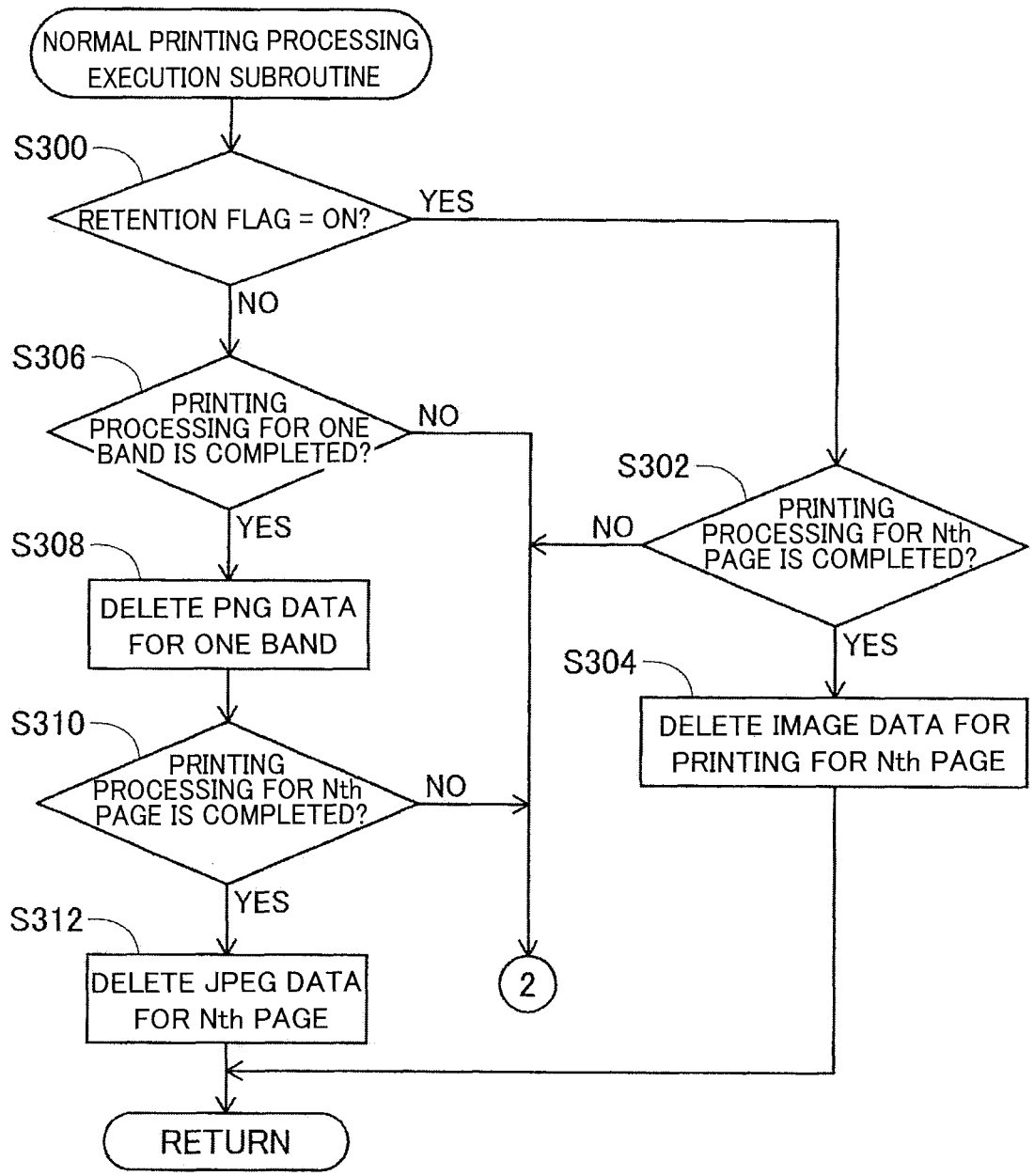
FIG. 8 is a flowchart of the control program of the printer.
Figure 9:
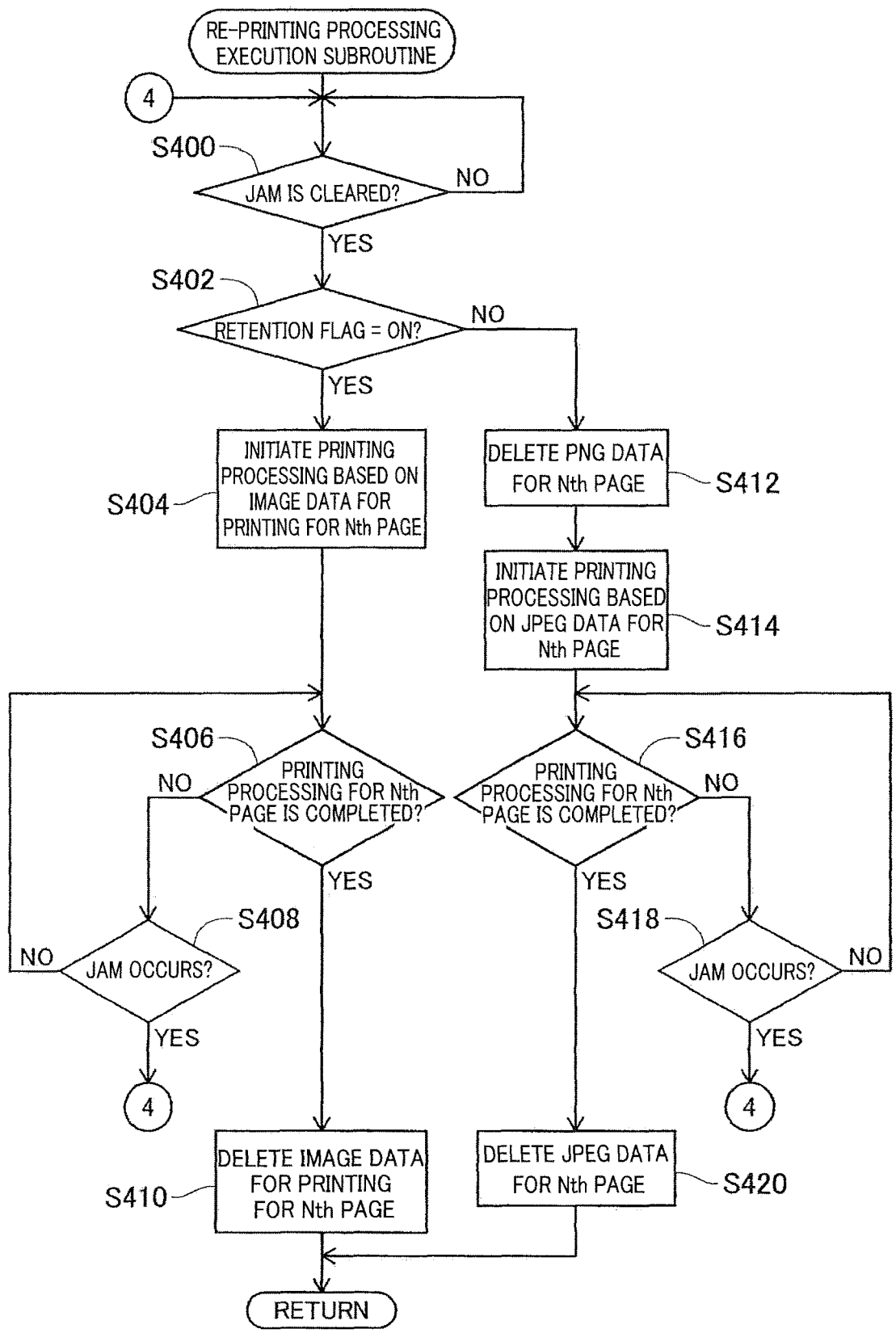
FIG. 9 is a flowchart of the control program of the printer.

In the printer 50, the CPU 52 executes the control program 66 to execute the print processing. There will be next described, with reference to FIGS. 7-9, flows of processing when the control program 66 is executed.

Figure 7:
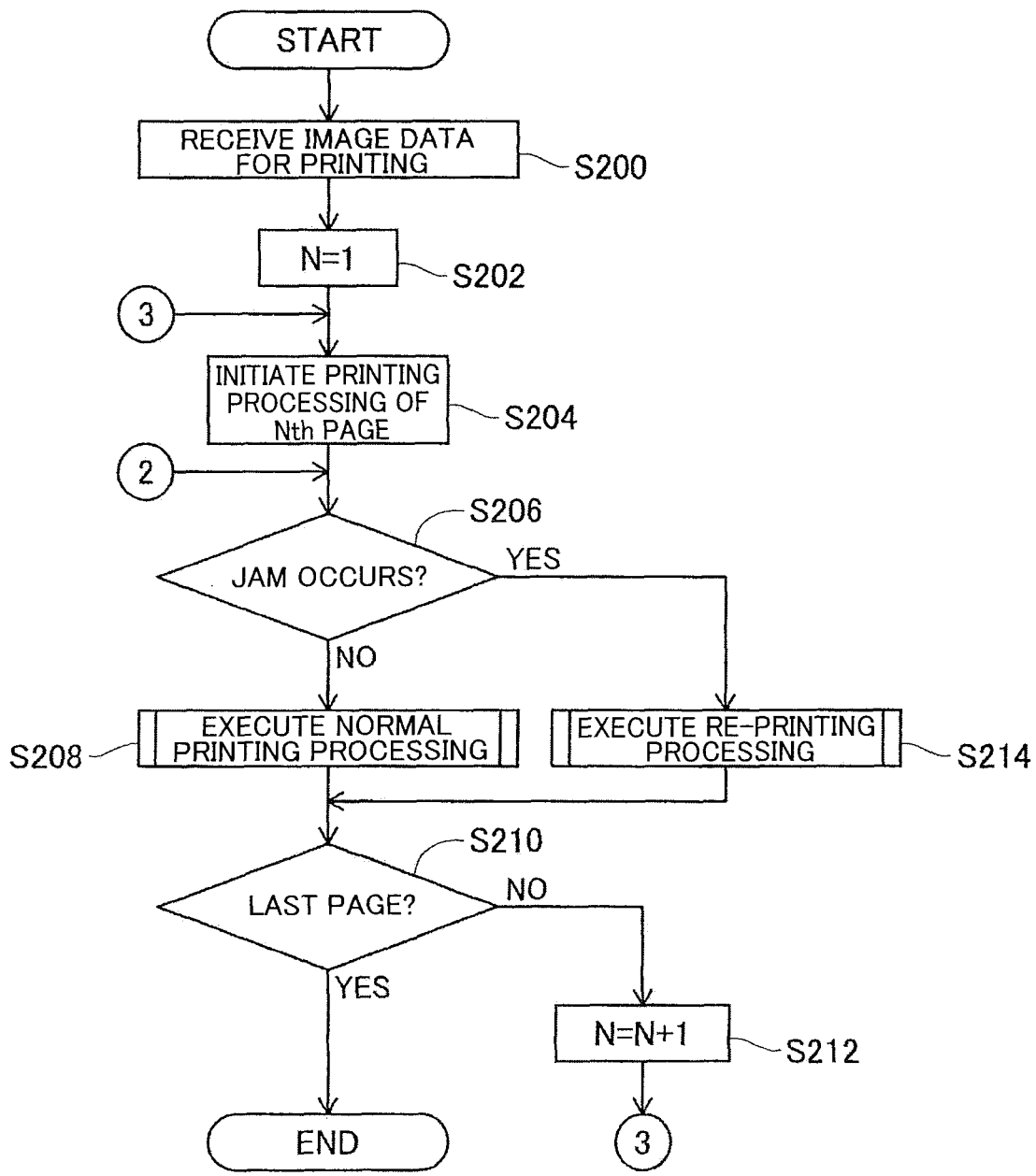
FIG. 7 is a flowchart of a control program of a printer.

This flow begins with S200 in FIG. 7 at which the printer 50 receives the print image data from the PC 10. The printer 50 sets N to one at S202. The printer 50 at S204 initiates the print processing for the Nth page based on the received print image data. That is, when the printer 50 has received the irreversibly-and-reversibly-compressed print image data or the reversibly-compressed print image data, the printer 50 initiates the print processing based on the PNG data representing the Nth page, and when the printer 50 has received the irreversibly-compressed print image data, the printer 50 initiates the print processing based on the JPEG data representing the Nth page.

The printer 50 at S206 determines whether a jam occurs. When no jam occurs (S206: NO), the printer 50 at S208 executes a normal print processing execution subroutine illustrated in FIG. 8. In the normal print processing execution subroutine, the printer 50 at S300 determines whether the retention flag included in the printing information for the Nth page is ON. When the retention flag is ON (S300: YES), the printer 50 at S302 determines whether the print processing for the Nth page is completed.

When the print processing for the Nth page is not completed (S302: NO), this flow returns to S206. When the print processing for the Nth page is completed (S302: YES), the printer 50 at S304 deletes the print image data representing the Nth page. That is, when having received the reversibly-compressed print image data, the printer 50 deletes the PNG data representing the Nth page, and when having received the irreversibly-compressed print image data, the printer 50 deletes the JPEG data representing the Nth page. Upon completion of the processing at S304, the normal print processing execution subroutine ends.

When the retention flag is not ON at S300 (S300: NO), that is, when the retention flag is OFF, the printer 50 determines at S306 whether the print processing for one band is completed. That is, the printer 50 determines whether the print processing for one band is completed in the print processing based on the PNG data representing the Nth page which is included in the irreversibly-and-reversibly-compressed print image data. When the print processing for one band is not completed (S306: NO), this flow returns to S206. When the print processing for one band is completed (S306: NO), the printer 50 at S308 deletes the PNG data corresponding to one band.

At S310, the printer 50 determines whether the print processing for the Nth page is completed. When the print processing for the Nth page is not completed (S310: NO), this flow returns to S206. When the print processing for the Nth page is completed (S310: YES), the printer 50 at S312 deletes the JPEG data representing the Nth page. That is, the printer 50 deletes the JPEG data representing the Nth page in response to the completion of the print processing based on the PNG data representing the Nth page which is included in the irreversibly-and-reversibly-compressed print image data. Upon completion of the processing at S312, the normal print processing execution subroutine ends.

When the normal print processing execution subroutine ends, this flow returns to the main routine illustrated in FIG. 7, and the printer 50 at S210 determines whether the Nth page is the last page. When the Nth page is not the last page (S210: NO), the printer 50 adds one to N at S212. Upon completion of this processing, this flow returns to S204. When the Nth page is the last page (S210: YES), this flow ends.

When the printer 50 at S206 determines that a jam occurs (S206: YES), the printer 50 at S214 executes a re-print processing execution subroutine illustrated in FIG. 9. In the re-print processing execution subroutine, the printer 50 at S400 determines whether a jam is cleared. When the jam is not cleared (S400: NO), the processing at S400 is repeated. When the jam is cleared (S400: YES), the printer 50 at S402 determines whether the retention flag included in the printing information for the Nth page is ON.

When the retention flag is ON (S402: YES), the printer 50 at S404 initiates the print processing based on the print image data representing the Nth page. That is, when having received the reversibly-compressed print image data, the printer 50 initiates the print processing based on the PNG data representing the Nth page, and when having received the irreversibly-compressed print image data, the printer 50 initiates the print processing based on the JPEG data representing the Nth page.

The printer 50 at S406 determines whether the print processing for the Nth page is completed. When the print processing for the Nth page is not completed (S406: NO), the printer 50 at S408 determines whether a jam occurs. When no jam occurs (S408: NO), this flow returns to S406. When a jam occurs (S408: YES), this flow returns to S400.

When the printer 50 at S406 determines that the print processing for the Nth page is completed (S406: YES), the printer 50 at S408 deletes the print image data representing the Nth page. That is, when having received the reversibly-compressed print image data, the printer 50 deletes the PNG data representing the Nth page, and when having received the irreversibly-compressed print image data, the printer 50 deletes the JPEG data representing the Nth page. Upon completion of the processing at S408, the re-print processing execution subroutine ends.

When the printer 50 at S402 determines that the retention flag is not ON (S402: NO), that is, when the retention flag is OFF, the printer 50 deletes the PNG data for the Nth page at S412. That is, the printer 50 deletes the PNG data representing the Nth page which is included in the irreversibly-and-reversibly-compressed print image data. The printer 50 at S414 initiates the print processing based on the JPEG data representing the Nth page which is included in the irreversibly-and-reversibly-compressed print image data.

The printer 50 at S416 determines whether the print processing for the Nth page is completed. When the print processing for the Nth page is not completed (S416: NO), the printer 50 at S418 determines whether a jam occurs. When no jam occurs (S418: NO), this flow returns to S416. When a jam occurs (S418: YES), this flow returns to S400.

When the print processing for the Nth page is completed at S416 (S416: YES), the printer 50 at S420 deletes the JPEG data representing the Nth page which is included in the irreversibly-and-reversibly-compressed print image data. Upon completion of the processing at S420, the re-print processing execution subroutine ends.

When the re-print processing execution subroutine is ends, this flow returns to the main routine illustrated in FIG. 7, and the printer 50 at S210 determines whether the Nth page is the last page. When the Nth page is not the last page (S210: NO), the printer 50 adds one to N at S212. Upon completion of this processing, this flow returns to S204. When the Nth page is the last page (S210: YES), this flow ends.

While the embodiment has been described above, it is to be understood that the disclosure is not limited to the details of the illustrated embodiment, but may be embodied with various changes and modifications, which may occur to those skilled in the art, without departing from the spirit and scope of the disclosure. For example, in the embodiment described above, the printer 50 deletes the PNG data corresponding to one band each time when the print processing for one band is completed in the print processing based on the PNG data representing the Nth page which is included in the irreversibly-and-reversibly-compressed print image data. However, each time when the print processing for a plurality of bands is completed, the printer 50 may delete the PNG data corresponding to the plurality of bands.

The present disclosure is applied to the case where the print processing is interrupted due to a jam in the above-described embodiment but may be applied to a case where the print processing is interrupted in various situations. For example, the present disclosure may be applied to cases such as a case where the print processing is interrupted due to running out of ink and a case where the print processing is interrupted due to drawing-out of a tray during printing.

While the processings illustrated in FIGS. 6-9 are executed by the CPUs 12, 52 in the above-described embodiment, other devices may execute these processings. For example, these processings may be executed by an ASIC or other logical integrated circuits and may be executed by cooperation of the CPU, the ASIC, and other logical integrated circuits, for example.

What is claimed is:

1. A non-transitory storage medium storing a program readable by a computer of an information processing apparatus, the information processing apparatus comprising a communication interface configured to communicate with a printing apparatus,
wherein, when executed by the computer, the program causes the information processing apparatus to perform:
creating irreversibly-compressed data representing a to-be-printed image and reversibly-compressed data representing the to-be-printed image as print image data, the to-be-printed image being an image to be printed on a sheet, the print image data being image data for printing;
transmitting the created print image data to the printing apparatus,
creating irreversibly-compressed data without creating reversibly-compressed data as the print image data, when print processing for the to-be-printed image on the sheet is secure print processing;
creating irreversibly-compressed data and reversibly-compressed data as the printing image data when the print processing for the to-be-printed image on the sheet is not the secure print processing;
determining whether the number of colors of an image included in a particular region of the to-be-printed image is greater than or equal to a preset number;
creating irreversibly-compressed data without creating reversibly-compressed data as the print image data when the information processing apparatus determines that the number of colors of the image included in the particular region is greater than or equal to the preset number, and the print processing for the to-be-printed image on the sheet is the secure print processing; and
creating reversibly-compressed data without creating irreversibly-compressed data when the information processing apparatus determines that the number of colors of the image included in the particular region is less than the preset number, and the print processing for the to-be-printed image on the sheet is the secure print processing.

2. The non-transitory storage medium according to claim 1, wherein, when executed by the computer, the program causes the information processing apparatus to perform:
determining whether the number of colors of an image included in a particular region of the to-be-printed image is greater than or equal to a preset number; and creating irreversibly-compressed data and reversibly-compressed data as the print image data when the information processing apparatus determines that the number of colors of the image included in the particular region is greater than or equal to the preset number.

3. The non-transitory storage medium according to claim 2, wherein, when executed by the computer, the program causes the information processing apparatus to create reversibly-compressed data without creating the irreversibly-compressed data as the print image data, when the information processing apparatus determines that the number of colors of the image included in the particular region is less than the preset number.

4. The non-transitory storage medium according to claim 2, wherein a longitudinal direction of the particular region is directed along a longitudinal direction of the sheet on which the to-be-printed image is printed.

5. An information processing apparatus, comprising:
a communication interface configured to communicate with a printing apparatus; and
a controller,
wherein the controller comprises:
a first image creator configured to create irreversibly-compressed data representing a to-be-printed image as print image data, the to-be-printed image being an image to be printed on a sheet, the print image data being image data for printing;
a second image creator configured to create reversibly-compressed data representing the to-be-printed image as the print image data; and
an image transmitter configured to transmit the created print image data to the printing apparatus,
a third image creator configured to create irreversibly-compressed data without creating reversibly-compressed data as the print image data, when print processing for the to-be-printed image on the sheet is secure print processing;
a fourth image creator configured to create irreversibly-compressed data and reversibly-compressed data as the printing image data when the print processing for the to-be-printed image on the sheet is not the secure print processing; and
a determiner configured to determine whether the number of colors of an image included in a particular region of the to-be-printed image is greater than or equal to a preset number;
a fifth image creator configured to create irreversibly-compressed data without creating reversibly-compressed data as the print image data when the determiner determines that the number of colors of the image included in the particular region is greater than or equal to the preset number, and the print processing for the to-be-printed image on the sheet is the secure print processing; and
a sixth image creator configured to create reversibly-compressed data without creating irreversibly-compressed data when the determiner determines that the number of colors of the image included in the particular region is less than the preset number, and the print processing for the to-be-printed image on the sheet is the secure print processing.

6. A printing apparatus, comprising:
a communication interface configured to communicate with an information processing apparatus; and
a controller,
wherein the controller is configured to control the printing apparatus to perform:
receiving (i) irreversibly-compressed data corresponding to a plurality of pages including a particular page and (ii) reversibly-compressed data corresponding to the plurality of pages from the information processing apparatus, the irreversibly-compressed data comprising a plurality of irreversibly-compressed-page data respectively corresponding to the plurality of pages, the reversibly-compressed data comprising a plurality of reversibly-compressed-page data respectively corresponding to the plurality of pages;

deleting first partial reversibly-compressed data that is partial data of reversibly-compressed particular-page data corresponding to the particular page when printing of a partial image that is a part of a particular-page image corresponding to the particular page is completed, the received reversibly-compressed data including the reversibly-compressed-particular-page data; and executing print processing based on irreversibly-compressed-particular page data, corresponding to the particular page, of the received irreversibly-compressed data when execution of print processing based on the reversibly-compressed-particular-page data is interrupted and the first partial reversibly-compressed data is deleted.

7. A communication system, comprising:

an information processing apparatus comprising a first controller and a first communication interface configured to communicate with a printing apparatus; and a printing apparatus comprising a second controller and a second communication interface configured to communicate with the information processing apparatus, wherein the first controller is configured to perform:

creating (i) irreversibly-compressed data corresponding to a plurality of pages including a particular page and (ii) reversibly-compressed data corresponding to the plurality of pages; and transmitting the created (i) irreversibly-compressed data and (ii) reversibly-compressed data to the printing apparatus, and wherein the second controller is configured to perform:

receiving (i) the irreversibly-compressed data and (ii) the reversibly-compressed data from the information processing apparatus, the irreversibly-compressed data comprising a plurality of irreversibly-compressed-page data respectively corresponding to the plurality of pages, the reversibly-compressed data comprising a plurality of reversibly-compressed-page data respectively corresponding to the plurality of pages;

deleting first partial reversibly-compressed data that is a partial data of reversibly-compressed-particular-page data corresponding to the particular page when printing of a partial image that is a part of a particular-page image corresponding to the particular page is completed, the received reversible-compressed data including the reversibly-compressed-particular-page data; and executing print processing based on irreversibly-compressed-particular-page data, corresponding to the particular page, of the received irreversibly-compressed data when execution of print processing based on the reversibly-compressed-particular-page data is interrupted and the first partial reversibly-compressed data is deleted.

* * * * *

UNITED STATES PATENT AND TRADEMARK OFFICE
CERTIFICATE OF CORRECTION

PATENT NO. : 10,540,580 B2  
APPLICATION NO. : 16/000000  
DATED : January 21, 2020  
INVENTOR(S) : Jun Morikawa Page 1 of 1

It is certified that error appears in the above-identified patent and that said Letters Patent is hereby corrected as shown below:

In the Claims

Column 18, Claim 7, Line 19 should read:
is completed, the received reversibly-compressed Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*